United States Patent
Gerdes et al.

(10) Patent No.: US 6,638,014 B2
(45) Date of Patent: Oct. 28, 2003

(54) VALVE ARRANGEMENT FOR A POWER PLANT

(75) Inventors: Ralf Gerdes, Untersiggenthal (CH); Roger Padfield, Rugby (GB); Franz Suter, Gebenstorf (CH)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 10/108,416

(22) Filed: Mar. 29, 2002

(65) Prior Publication Data

US 2003/0035720 A1 Feb. 20, 2003

Related U.S. Application Data

(60) Provisional application No. 60/312,782, filed on Aug. 17, 2001.

(30) Foreign Application Priority Data

Feb. 6, 2002 (CH) ..................................... 2002 0197/02

(51) Int. Cl.[7] .............................................. F01D 17/14
(52) U.S. Cl. .................... 415/145; 415/149.2; 415/151; 415/155; 415/202
(58) Field of Search .................... 415/144, 145, 415/149.2, 151, 155, 202, 149.1; 137/883

(56) References Cited

U.S. PATENT DOCUMENTS 3,460,566 A * 8/1969 Heartstedt et al. .......... 137/571
4,042,178 A * 8/1977 Veltrup et al. ................. 251/44
4,481,776 A 11/1984 Araki et al.
4,642,025 A 2/1987 Heiniger et al.
4,740,112 A * 4/1988 Muehlberger et al. ........ 406/50
5,309,707 A * 5/1994 Provol et al. .................. 60/773

FOREIGN PATENT DOCUMENTS

| FR | 2309710 | 11/1976 |
|---|---|---|
| GB | 154602 | 6/1921 |
| GB | 260276 | 1/1928 |

OTHER PUBLICATIONS

Heinrich Lageder et al., "Die modulare Baureihe der ABB–Dampfturbinen mit Zwischenüberhitzung", ABB Technik 5/90, Dampfturbinen, pp. 1–10.

Gerhard J. Weiss, "Valve Test with Single Valve Arrangment", 2000 International Joint Power Generation Conference: Session 2: Design Operation & Maintenance of Advanced Turbines, Miami Beach; Jul. 23–26, 2000, pp. 1–8.

* cited by examiner

Primary Examiner—Ninh H. Nguyen
(74) Attorney, Agent, or Firm—Burns, Doane, Swecker & Mathis, L.L.P.

(57) ABSTRACT

The invention relates to a valve arrangement (1), in particular for a power plant. A housing (2) contains a shut-off valve (3) for shutting off a fluid flow, a control valve (4) for controlling the fluid flow through a housing outlet (8) and a bypass valve (5) for controlling the fluid flow through a bypass (13). This bypass (13) branches off from the housing (2) between the shut-off valve (3) and the control valve (4).

17 Claims, 4 Drawing Sheets

VALVE ARRANGEMENT FOR A POWER PLANT

This application claims priority under 35 U.S.C. §119 to U.S. Provisional Application No. 60/312,782 entitled Control and Stop Valve for Fluids and filed on Aug. 17, 2001, the entire content of which is hereby incorporated by reference.

FIELD OF THE INVENTION

The invention relates to a valve arrangement for controlling and shutting off a fluid flow, in particular for a power plant.

BACKGROUND OF THE INVENTION

In a multiplicity of technical applications in which fluid flows have to be controlled, valve arrangements of the type mentioned at the beginning are used, these valve arrangements having a control valve and a shut-off valve, the shut-off valve and the control valve being designed to be separate for safety reasons. During normal operation in the respective application, the control valve serves to control or regulate the volumetric flow and/or the pressure of the respective fluid flow. In contrast, the shut-off valve serves to shut off the fluid flow in an emergency. Such a shut-off valve is normally designed as an emergency-trip valve in order to be able to stop the fluid flow in as short a time as possible in an emergency. In certain applications, operating states may occur in which an additional fluid flow is required, and this additional fluid flow has to be controlled in addition to or alternatively to the main fluid flow controlled with the control valve. This additional fluid flow often has to be introduced at a different location from the main fluid flow. For example, the valve arrangement serves to control a steam flow which is fed to a steam turbine in a power plant. During normal operation, the control valve controls or regulates the steam feed to the high-pressure side of the steam turbine. For certain operating states, e.g. for a brief increase in power of the steam turbine, it is necessary to introduce additional steam at an intermediate stage of the steam turbine. This may be achieved with an additional steam line. In this case, it is expedient, in an emergency, to be able to shut off this additional steam line with the shut-off valve of the valve arrangement together with a main steam line controlled by the control valve. In order to achieve this, considerable outlay is required in order to connect the additional steam line to the valve arrangement.

SUMMARY OF THE INVENTION

The invention is intended to provide a remedy here. The invention as defined in the claims deals with the problem of specifying an improved embodiment for a valve arrangement of the type mentioned at the beginning, this improved embodiment simplifying, in particular, the coupling of an additional fluid flow to the shut-off valve.

This problem is solved by the subject matter of the independent claim. Advantageous embodiments are the subject matter of the dependent claims.

The present invention is based on the general idea of providing the valve arrangement with a bypass valve in addition to the control valve and the shut-off valve, all three valves being accommodated in a common housing. In this case, the bypass valve serves to control an (additional) fluid flow through a bypass which branches off in the housing upstream of the control valve and downstream of the shut-off valve. Since the shut-off valve is therefore located upstream of the other two valves, the shut-off valve, in an emergency, can shut off both the fluid flow controlled with the control valve and the fluid flow controlled with the bypass valve. The installation cost required to realize the bypass flow is reduced by the bypass valve being integrated in the common housing. Furthermore, the amount of material and space required for the entire arrangement is reduced. In particular in the case of a valve arrangement provided for a power plant, in which valve arrangement very large volumetric gas flows have to be controlled, the compact type of construction of the valve arrangement proposed has an especially advantageous effect.

Further important features and advantages of the valve arrangement according to the invention follow from the subclaims, the drawings and the associated description of the figures with reference to the drawings.

BRIEF DESCRIPTION OF THE DRAWINGS

Preferred exemplary embodiments of the invention are shown in the drawings and are explained in more detail in the description below, the same reference numerals referring to the same or functionally identical or similar components. In the drawings, in each case schematically.

DETAILED DESCRIPTION OF THE INVENTION

Figure 1:
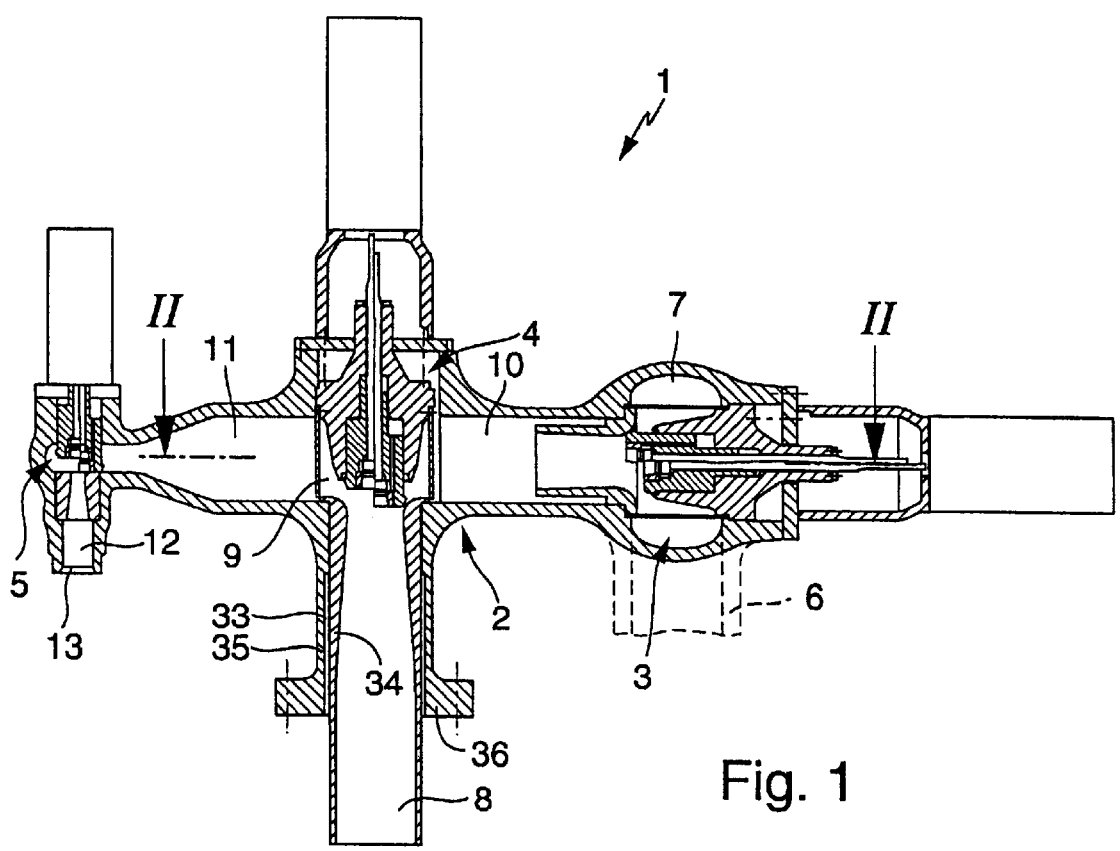
FIG. 1 shows a sectional view through a valve arrangement according to the invention in a first embodiment.

According to FIG. 1, a valve arrangement 1 according to the invention has a housing 2 in which a shut-off valve 3, a control valve 4 and a bypass valve 5 are integrated. At a point which cannot be seen in FIG. 1, a housing inlet 6 (cf. FIGS. 2 and 3) communicates with an annular space 7 which is arranged upstream of the shut-off valve 3. For the sake of clarity, the housing inlet 6 is indicated by broken lines. Arranged downstream of the control valve 4 is a housing outlet 8, which can be connected to a fluid consumer (not shown in FIG. 1). According to FIGS. 1 and 2, a further annular space 9 is formed in the region of the control valve 4 in the housing 2, via which annular space 9 a first interior-space section 10 can communicate with a second interior-space section 11 of the housing 2. The two interior-space sections 10 and 11 are in each case arranged upstream of the control valve 4 and downstream of the shut-off valve 3. The first interior-space section 10 virtually forms the outlet region of the shut-off valve 3, whereas the second interior-space section 11 virtually forms the inlet region of the bypass valve 5. A bypass line 13 starts at an outlet 12 of the bypass valve 5 (cf. also FIG. 3).

Since the interior-space sections 10 and 11 circumvent the control valve 4 via the annular space 9, a parallel arrangement from the fluidic point of view is obtained for the bypass valve 5 and the control valve 4. Accordingly, the bypass branches off fluidically between the control valve 4 and the shut-off valve 3, since the inlet region of the bypass valve 5 is arranged downstream of the shut-off valve 3 on the one hand and upstream of the control valve 4 on the other hand.

As can be seen from FIG. 1, the valve arrangement 1 according to the invention is especially compact and at the same time forms an assembly unit which can be preassembled and which can be attached completely to the respective fluid consumer.

Figure 3:
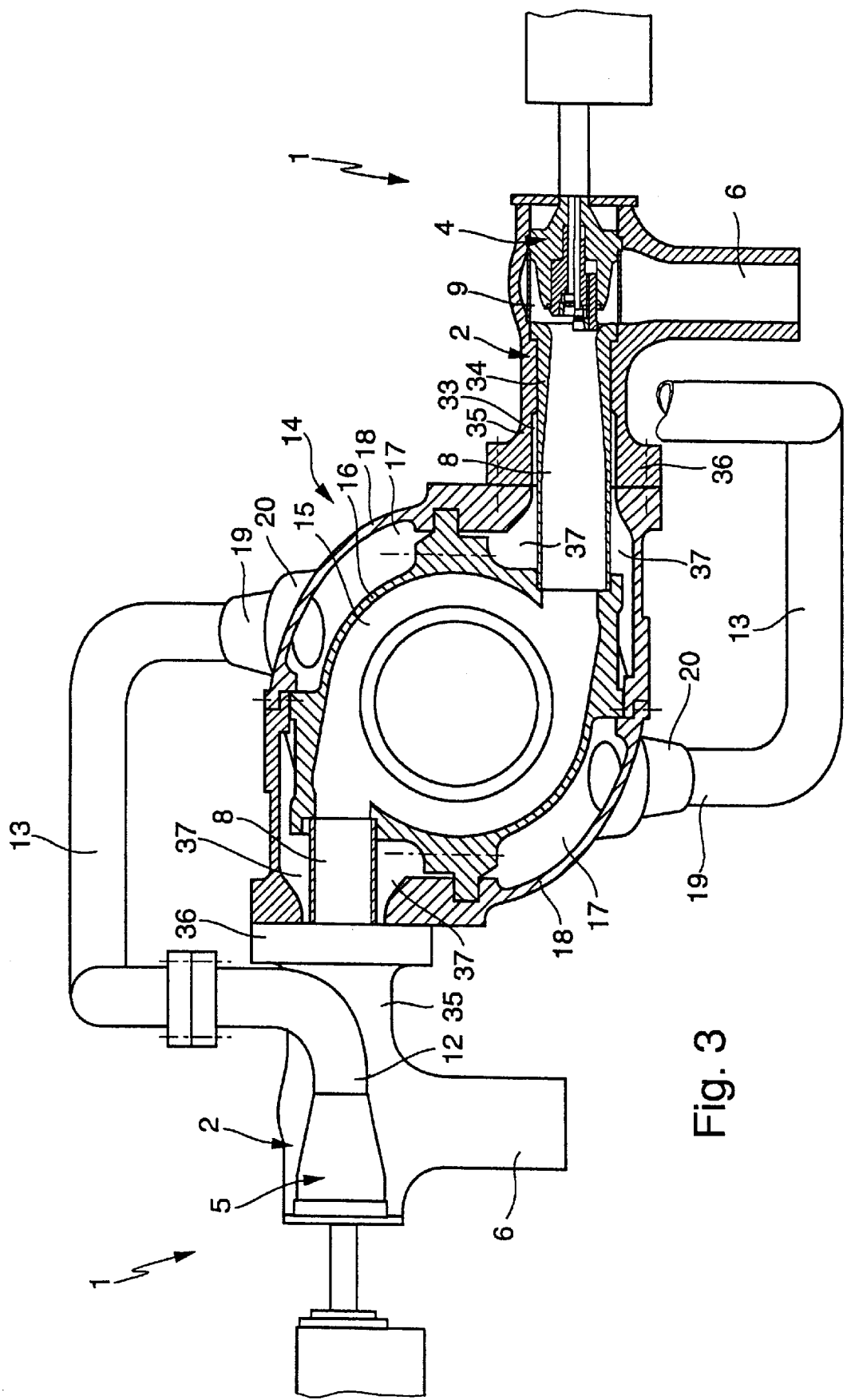
FIG. 3 shows a view of the valve arrangement according to FIG. 1 in a preferred use.

According to FIG. 3, in a preferred embodiment, the fluid consumer may be formed by a turbine 14, in particular by an air turbine. Such an air turbine 14 may form, for example, a component of a gas-storage power plant which is suitable in a special manner for use in a "Compressed-Air-Energy-Storage System", in short a CAES system. The basic idea of a CAES system is seen in the fact that excess electrical energy, which is generated by permanently operated conventional power plants during the base-load times, is transferred to the peak-load times in order to thereby use up less resources overall for producing the energy. This is achieved by air or another gas being pumped under a relatively high pressure into a reservoir by means of the inexpensive excess energy, from which reservoir the air or the gas can be extracted when required for generating relatively expensive current. This means that the energy is stored in a retrievable manner in the form of potential energy. Worked-out coal or salt mines, for example, serve as reservoirs. Since the storage medium used is expediently air, the term "air-storage power plant" is also used, and the turbine with which the stored air is expanded is then designed as an air turbine.

Such an air turbine 14 has a high-pressure space 15 which is formed in an inner casing 16 of the air turbine 14. The first pressure stage of the turbine 14 is normally arranged in this high-pressure space 15. In addition, the turbine 14 has a low-pressure space 17 which is formed in an outer casing 18 and is expediently arranged after the last pressure stage of the turbine 14. The outer casing 18 normally encases the inner casing 16.

According to FIG. 3, the housing outlet 8 of the valve housing 2 attached to the turbine 14 communicates with the high-pressure space 15. Accordingly, the housing outlet 8 is connected to the inner casing 16. In the embodiment according to FIG. 3, two valve arrangements 1 are attached to the turbine 14.

The bypass line 13 is connected to the housing 2 at the bypass-valve outlet 12. The bypass line 13 leads to the outer casing 18 of the turbine and communicates with the low-pressure space 17. For the connection of the bypass line 13 to the outer casing 18, the bypass line 13 is provided with a nozzle element 20 at its discharge end 19, the bypass fluid flow issuing from the bypass line 13 through this nozzle element 20 and entering the low-pressure space 17.

Figure 4:
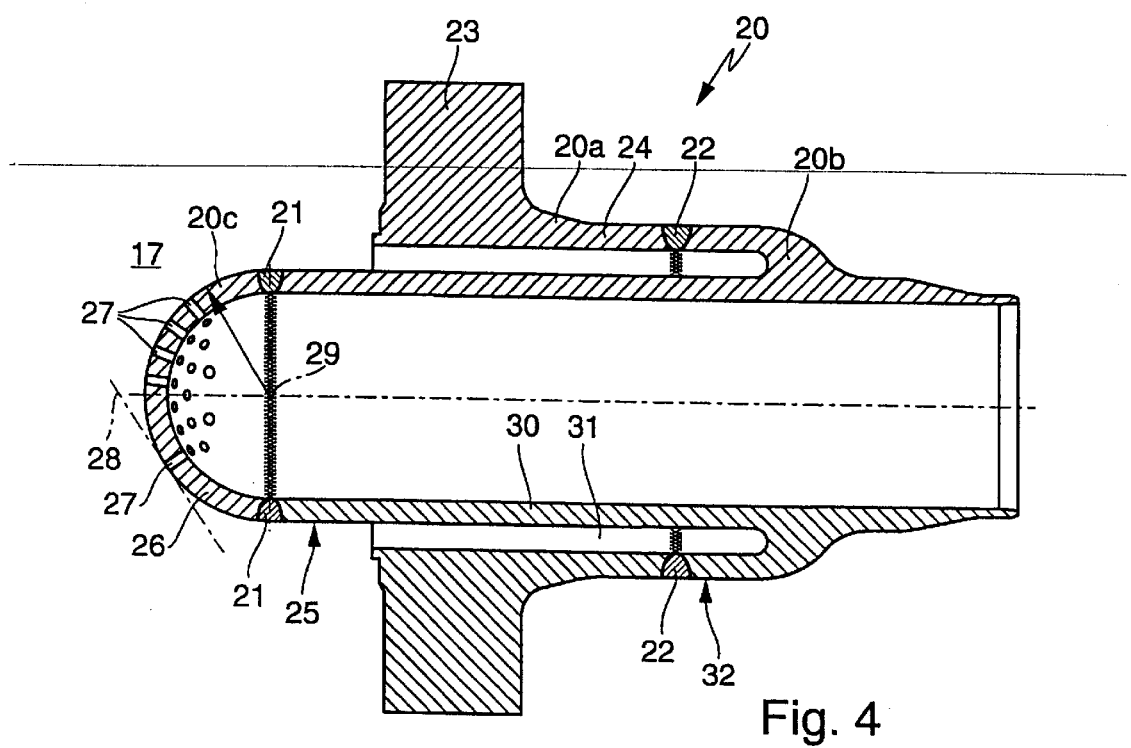
FIG. 4 shows a sectional view through a nozzle element of the valve arrangement according to FIGS. 1 to 3.

A preferred embodiment of this nozzle element 20 is reproduced in FIG. 4 and is composed of three parts 20a, 20b and 20c in the embodiment shown here, the individual parts 20a, 20b, 20c being firmly connected to one another, for example, by welded joints 21 and 22. The nozzle element 20 has a flange 23, which is of annular design in this case and has a cylindrical sleeve 24 radially on the inside. In this case, the flange 23 and sleeve 24 form the first individual part 20a. With the flange 23, the nozzle element 20 can be attached to a target-space casing, according to FIG. 3 to the outer casing 18, which contains a target space, according to FIG. 3 the low-pressure space 17. Via its sleeve 24, the flange 23 is connected to the second individual part 20b.

The nozzle element 20 has an inflow nozzle 25, which projects in the axial direction beyond the flange 23 to such an extent that it projects into the respective target space, e.g. the low-pressure space 17, when the nozzle element 20 is fastened to the target-space casing, that is, for example, to the outer casing 18. The inflow nozzle 25 comprises a nozzle body 26, which in this case forms the third individual part 20c. The nozzle body 26 is shaped in such a way that it is curved into the target space 17 and has a spherical, here hemispherical, form. The nozzle body 26 contains a plurality of discharge openings 27 which are arranged in a spatially distributed manner and through which the bypass flow can flow over into the target space 17. The discharge openings 27 are preferably arranged and oriented in such a way that only a relatively short inlet jet is obtained in the target space 17 and/or that flow conditions which help to mix the bypass flow with a main flow possibly present in the target space 17 are obtained, and/or that undesirable cooling effects or heating effects at the surface of the target-space casing 18 or at any other component in the target-space casing 18 are avoided. For this purpose, the discharge openings 27 are oriented in such a way that they in each case extend in different directions.

The discharge openings 27 are each oriented in such a way that they each extend essentially perpendicularly to an associated tangential plane 28. Of these tangential planes 28, only one is shown by way of example in FIG. 4. The tangential planes 28, in the target space 17, are tangent to the nozzle body 26 on its outer side in the orifice region of the respectively associated discharge opening 27. In the preferred embodiment shown here, all the discharge openings 27 extend essentially radially with respect to a common center point 29, which in the case of a hemispherical nozzle body 26 expediently coincides with the center of the hemisphere.

The inflow nozzle 25 comprises a cylindrical tube 30 or is formed on the discharge end of this tube 30. The nozzle body 26 is welded to the outflow-side axial end of this tube 30. The tube 30 expediently has the same diameter as the nozzle body 26 designed as a hemisphere. The tube 30 is arranged concentrically to the sleeve 24 of the flange 23, the outside diameter of the tube 30 and the inside diameter of the sleeve 24 being matched to one another in such a way that a cylindrical space 31 is formed radially between tube 30 and sleeve 24. Formed on the tube 30 at a point remote from the nozzle body 26 is an annular collar 32, via which the sleeve 24 and thus the first individual part 20a are connected to the tube 30. In this case, that axial end of the cylindrical space 31 which faces away from the inflow nozzle 25 is closed by the annular collar 32. The tube 30 together with the annular collar 32 formed thereon forms the second individual part 20b of the nozzle element 20.

At its axial end facing the inflow nozzle 25, the cylindrical space 31 is designed to be open and communicates with the target space 17. Temperature differences between the target-space casing 18, on which the flange 23 is mounted, and the bypass flow, to which the tube 30 is subjected, can be compensated for by this type of construction. The thermally induced material expansions occurring in the process, due to the shaping selected, in particular due to the cylindrical space 31, lead to small or to only relatively small, controllable stresses inside the nozzle element 20.

Figure 2:
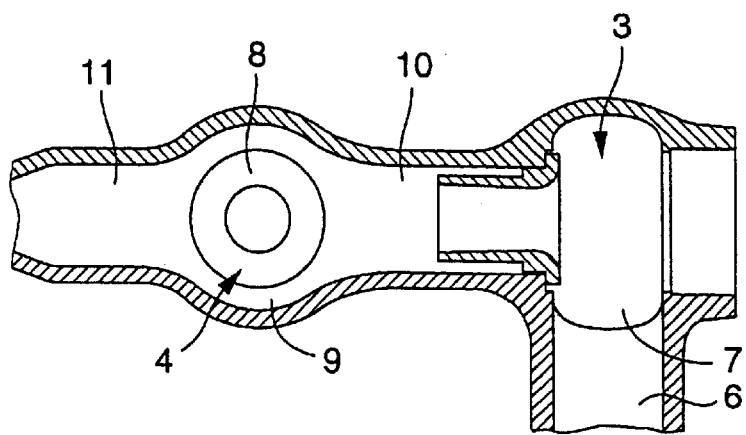
FIG. 2 shows a simplified sectional representation of the valve arrangement according to FIG. 1 along section lines II in FIG. 1.
Figure 5:
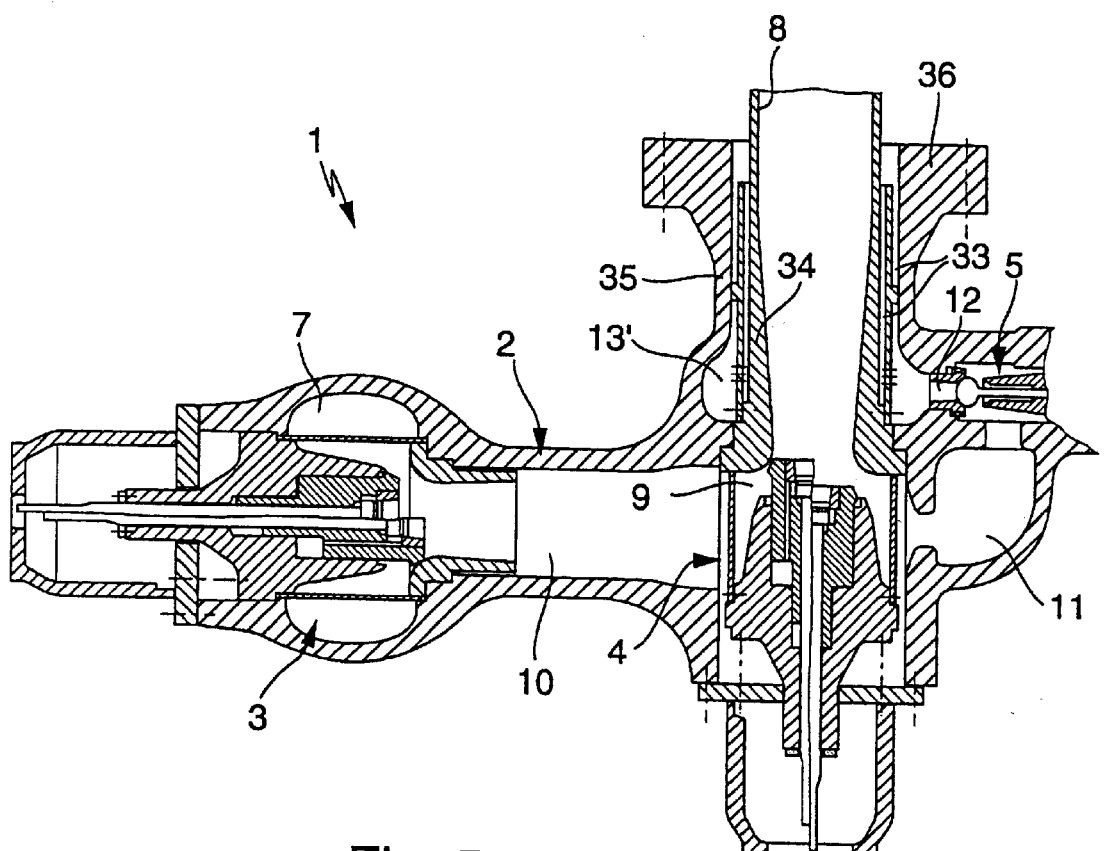
FIG. 5 shows a sectional view as in FIG. 1 but in a second embodiment.

Whereas in the embodiment in FIGS. 1 to 3 the bypass line 13 is designed as a separate component which is attached to the housing 2 of the valve arrangement 1, a bypass line 13' integrated in the housing 2 may be provided in the embodiment according to FIG. 5. In this case, this bypass line 13' is formed by a radial gap 33 between a diffuser 34 of the control valve 4 and a housing section 35. The diffuser 34 leads to the housing outlet 8 or merges into the housing outlet 8. The housing section 35 encases the diffuser 34 and has, for example, a flange 36 with which the housing 2 can be fastened to the turbine 14. By means of this construction, the bypass line 13' encases the housing outlet 8, at least right into the target space 17, through which the housing outlet 8 passes (cf. FIG. 3).

The gap 33 between diffuser 34 and housing section 35 can likewise be seen in FIG. 3, the gap 33 in the embodiment according to FIG. 3, in a similar manner to the cylindrical space 31 according to FIG. 4, serving to reduce temperature-induced stresses inside the housing 2. However, it can be seen from FIG. 3 how the gap 33 communicates with the low-pressure space 17 of the outer casing 18 at 37. In a corresponding manner, in the embodiment according to FIG. 5, the bypass line 13' can therefore communicate with the target space via the gap 33, that is to say in particular with the low-pressure space 17 in the outer casing 18.

The embodiment according to FIG. 5 is also extremely compact and permits a bypass flow to a predetermined target space while circumventing the control valve 4.

In a preferred use, the bypass flow may be used, for example, to preheat the outer casing 18 and the inner casing 16 by means of a suitably metered bypass flow before the main flow is admitted to the high-pressure space 15 via the gas outlet 8. Thermal stresses in the casings 16, 18 of the turbine 14 can be reduced by this preheating.

List of Designations
1 Valve arrangement
2 Housing
3 Shut-off valve
4 Control valve
5 Bypass valve
6 Housing inlet
7 Annular space
8 Housing outlet
9 Annular space
10 First interior-space section
11 Second interior-space section
12 Bypass outlet
13 Connected bypass line
13' Integrated bypass line
14 Turbine
15 High-pressure space of 14
16 Internal casing of 14
17 Low-pressure space of 14
18 Outer casing of 14
19 Discharge end of 13
20 Nozzle element
20a First individual part of 20
20b Second individual part of 20
20c Third individual part of 20
21 Weld
22 Weld
23 Flange
24 Sleeve of 23
25 Inflow nozzle
26 Nozzle body
27 Discharge opening
28 Tangential plane
29 Center point
30 Tube of 25
31 Cylindrical space
32 Annular collar of 30
33 Gap
34 Diffuser of 4
35 Housing section
36 Flange on 35
37 Connection between 33 and 17

What is claimed is:

1. A power plant valve arrangement, having a housing through which a fluid can flow and in which a shut-off valve for shutting of the fluid flow and, downstream thereof, a control valve for controlling the fluid flow through a housing outlet and a bypass valve for controlling the fluid flow through a bypass branching off between control valve and shut-off valve are arranged.

2. The power plant valve arrangement as claimed in claim 1, wherein the housing outlet communicates with a high-pressure space of a turbine, and wherein the bypass communicates with one of an intermediate-pressure space and a low-pressure space of the turbine.

3. The valve arrangement as claimed in claim 2, wherein the housing outlet is connected to an inner casing, containing the high-pressure space, of the turbine, and wherein the bypass is connected to an outer casing, containing the low-pressure space, of the turbine.

4. The power plant valve arrangement as claimed in claim 2, wherein the turbine is one of an air turbine of an air storage plant and a steam turbine.

5. The valve arrangement as claimed in claim 1, wherein the bypass has a bypass line connected to the housing.

6. The valve arrangement as claimed in claim 5, wherein the bypass line has a nozzle element at its discharge end, through which nozzle element the bypass fluid flow discharges from the bypass line and enters a target space.

7. The valve arrangement as claimed in claim 6, wherein the nozzle element has a flange which can be attached to a target-space casing containing the target space.

8. The valve arrangement at least as claimed in claim 7, wherein
   the flange is designed as a ring and has a cylindrical sleeve radially on the inside,
   the inflow nozzle is formed on the discharge end of a cylindrical tube or has a cylindrical tube,
   the tube being arranged concentrically in the sleeve,
   the sleeve being connected to the tube in a section facing away from the target space,
   a cylindrical space which is open toward the target space being formed radially between tube and sleeve.

9. The valve arrangement as claimed in claim 8, wherein the flange is welded to its sleeve and/or the nozzle body is welded to the tube.

10. The valve arrangement as claimed in claim 6, wherein the nozzle element has an inflow nozzle which projects into the target space.

11. The valve arrangement as claimed in claim 10, wherein the inflow nozzle has a spherical or hemispherical nozzle body which is curved into the target space and has a plurality of discharge openings.

12. The valve arrangement as claimed in claim 11, wherein the discharge openings are arranged on the nozzle body in a spatially distributed manner.

13. The valve arrangement as claimed in claim 11, wherein the discharge openings extend in different directions.

14. The valve arrangement as claimed in claim 11, wherein the discharge openings extend essentially radially with respect to a common center point and/or wherein each discharge opening extends essentially perpendicularly to a tangential plane which, in the target space, is tangent to the nozzle body in the orifice region of the respective discharge opening.

15. The valve arrangement as claimed in claim 1, wherein the bypass has a bypass line integrated in the housing.

16. The valve arrangement as claimed in claim 15, wherein the bypass line encases the housing outlet.

17. The valve arrangement as claimed in claim 15, wherein the bypass line is formed by a radial gap between a diffuser, leading to the housing outlet, of the control valve and a housing section containing the diffuser.

* * * * *